(12) United States Patent
Reial

(10) Patent No.: US 7,480,356 B2
(45) Date of Patent: Jan. 20, 2009

(54) METHOD OF AND SYSTEM FOR PATH SELECTION IN RICH MULTIPATH CONDITIONS

(75) Inventor: Andres Reial, Lund (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 600 days.

(21) Appl. No.: 11/007,685

(22) Filed: Dec. 8, 2004

(65) Prior Publication Data

US 2006/0120438 A1    Jun. 8, 2006

(51) Int. Cl.
  *H04B 1/10* (2006.01)
(52) U.S. Cl. ............... 375/349; 375/148; 375/144; 370/342; 455/63.1; 455/65
(58) Field of Classification Search ........... 375/144, 375/148, 349; 370/342; 455/63.1, 65, 501
See application file for complete search history.

(56) References Cited

U.S. PATENT DOCUMENTS

| | | | |
|---|---|---|---|
| 6,340,578 B1 | 1/2002 | Anderson, III et al. | |
| 6,377,613 B1 | 4/2002 | Kawabe et al. | |
| 6,560,273 B1 | 5/2003 | Sourour et al. | |
| 6,574,483 B1 | 6/2003 | Amerga | |
| 6,580,749 B1 * | 6/2003 | Miura | 375/147 |
| 6,611,512 B1 | 8/2003 | Burns | |
| 6,711,420 B1 | 3/2004 | Amerga et al. | |
| 6,731,622 B1 * | 5/2004 | Frank et al. | 370/342 |
| 6,731,676 B2 | 5/2004 | Rick et al. | |
| 7,075,974 B2 * | 7/2006 | Ohsuge | 375/152 |
| 2001/0028677 A1 | 10/2001 | Wang et al. | |
| 2002/0094017 A1 | 7/2002 | Wang | |
| 2003/0103555 A1 | 6/2003 | Kyungtae et al. | |
| 2003/0171136 A1 | 9/2003 | Peng | |
| 2003/0215002 A1 | 11/2003 | Gorday et al. | |
| 2004/0052304 A1 | 3/2004 | Reial | |
| 2004/0071193 A1 | 4/2004 | Atarashi et al. | |
| 2004/0097204 A1 | 5/2004 | Jung et al. | |
| 2004/0114674 A1 | 6/2004 | Lotter et al. | |

FOREIGN PATENT DOCUMENTS

| | | |
|---|---|---|
| EP | 1 028 540 A2 | 8/2000 |
| EP | 1 065 794 | 1/2001 |
| EP | 1 158 688 A1 | 11/2001 |
| EP | 1 303 058 A2 | 4/2003 |
| EP | 1 372 269 A1 | 12/2003 |
| EP | 1 376 887 A1 | 1/2004 |
| WO | WO 00/38468 | 6/2000 |
| WO | WO-02/29994 | 4/2002 |

* cited by examiner

*Primary Examiner*—Phuong Phu
(74) *Attorney, Agent, or Firm*—Michael Cameron

(57) ABSTRACT

A signal-path-selection method in a RAKE receiver includes producing C channel estimates from M received signal paths, determining a plurality of best signal paths using the C produced channel estimates, choosing A signal paths of the plurality of best signal paths in accordance with at least one pre-determined criterion, and combining the A signal paths. C is a measure of channel-estimation capacity of the RAKE receiver. M is greater than C. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

20 Claims, 3 Drawing Sheets

METHOD OF AND SYSTEM FOR PATH SELECTION IN RICH MULTIPATH CONDITIONS

CROSS-REFERENCE TO RELATED APPLICATIONS

This patent application incorporates by reference the entire disclosure of a patent application filed on the same date as this patent application entitled Method of and System for Delay Estimation with Minimized Finger Allocation and bearing U.S. Pat. No. 11/007,687.

BACKGROUND OF THE INVENTION

1. Technical Field

The present invention relates to digital wireless communications systems in which delays of individual multipath components of a time-varying fading channel must be provided, such as, for example, systems using RAKE receivers in Code Division Multiple Access (CDMA) systems. The present invention is particularly suitable for receivers that operate in fading environments and have limited processing resources (e.g., receivers in Wideband (WCDMA) terminals), but is not limited to such receivers.

2. History of Related Art

In wireless communication systems, a physical channel between a transmitter and a receiver is formed by a radio link. In most cases, a transmit antenna is not narrowly focused towards the receiver and, in addition to a possible direct path, many other propagation paths often exist between the receiver and the transmitter. The other propagation paths are typically caused by reflections from objects in the surroundings. Rays with similar propagation distances combine at the receiver depending on an instantaneous phase relationship and form a distinct multipath component. An effect of the combining depends on the instantaneous relationship of the carrier wavelength and distance differences and, in the case of destructive interference, often leads to a significant path-gain magnitude decrease (i.e., fading).

Performance of the receiver may be improved by utilizing signal energy carried by many multipath components. The performance improvement is achieved using a RAKE receiver in which each multipath component is assigned a despreader whose reference copy of a spreading code is delayed equally to a path delay of a corresponding multipath component. Outputs of the despreaders (i.e., RAKE fingers) are coherently combined to produce a symbol estimate. The RAKE receiver requires knowledge of the multipath delays and the values of the channel impulse response for all paths.

To achieve an optimal signal-to-noise ratio (SNR) at a RAKE receiver combiner output, the signal energy from as many physical paths as possible should be collected. In addition, tracking as many different physical paths as possible (i.e., higher utilized diversity) significantly increases the robustness of reception, since the probability of a simultaneous deep fade of all tracked paths is reduced. Simultaneous deep fade is a phenomenon that can lead to significant signal block-error-rate (BLER) degradation.

CDMA requires soft handoff (SHO) at cell boundaries. During SHO, a receiver receives signals from multiple cells simultaneously until the SHO is completed. The RAKE receiver coherently combines the received signals to increase a received-signal energy and to improve a post-combining SNR. The signal path delays from all the cells are intended to be estimated. Following the signal-path-delay estimation, as many signal paths as possible are used for demodulation.

SUMMARY OF THE INVENTION

A signal-path-selection method in a RAKE receiver includes producing C channel estimates from M received signal paths, determining a plurality of best signal paths using the C produced channel estimates, choosing A signal paths of the plurality of best signal paths in accordance with at least one pre-determined criterion, and combining the A signal paths. C is a measure of channel-estimation capacity of the RAKE receiver. M is greater than C.

A RAKE receiver includes a channel estimator for producing C channel estimates from M received signal paths and a RAKE combiner for choosing A signal paths of M determined best signal paths and combining the A signal paths. C is a measure of channel-estimation capacity of the RAKE receiver. M is greater than C.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Various embodiments of the invention use a path-selection process that serves to reduce the number of delay values for which channel estimation must be performed in parallel and improve energy-capture robustness under rich-multipath fading such as, for example, in SHO.

Figure 1:
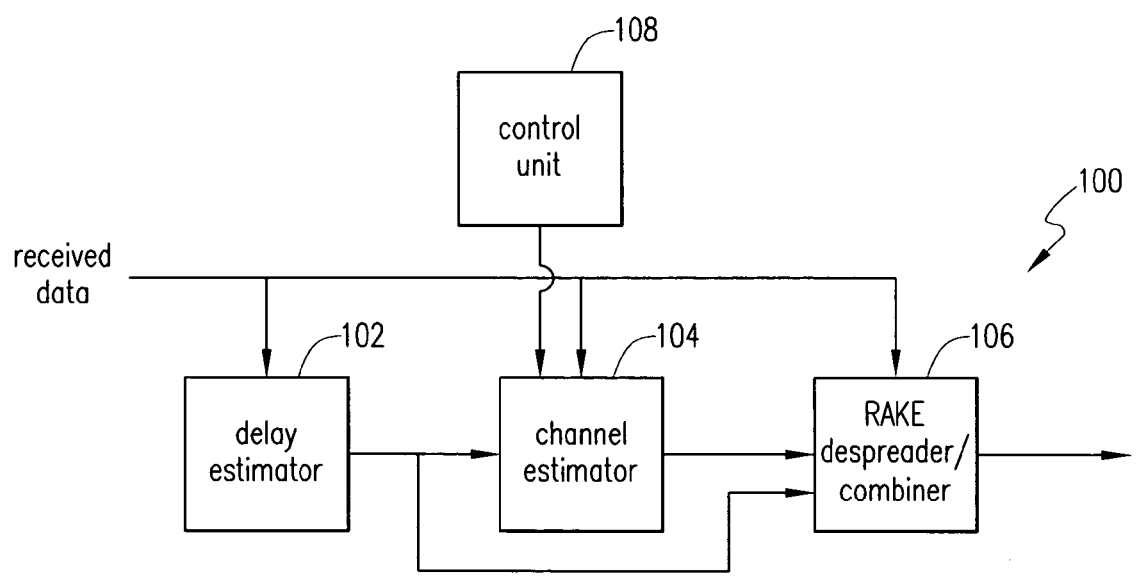
FIG. 1 is a block diagram of a RAKE receiver.

FIG. 1 is a block diagram of a RAKE receiver 100. The RAKE receiver 100 includes a delay estimator block 102, a channel estimator block 104, a RAKE despreader/combiner block 106, and a control unit 108. Received data are fed to the delay estimator block 102. The delay estimator block 102 evaluates an impulse response of a channel over a range of possible delays of the channel. A resulting delay profile, which may be a complex delay profile or a power delay profile, may then be subjected to peak detection and detected peak locations reported to the RAKE despreader/combiner block 106 as delay estimates for the multi-path components. The delay estimates are also used by the channel estimator block 104 to estimate corresponding complex channel coefficients by despreading a pilot sequence and possibly filtering results over time to reduce the effects of noise and interference. Channel parameters are estimated in collaboration between the delay estimator block 102, which determines temporal alignment of a despreader portion of the RAKE despreader/combiner block 106, and the channel estimator block 104, which estimates the complex coefficients to be used by a combiner portion of the RAKE despreader/combiner block 106. Although a single delay estimator block 102, a single despreader/combiner block 106, and a single channel estimator block 104 are illustrated in FIG. 1, it will be understood by one having skill in the art that each such block shown in FIG. 1 may represent a plurality of like components without departing from principles of the invention.

In a typical RAKE receiver implementation such as the RAKE receiver 100, let a number of cells involved in the SHO equal N. Each cell is assumed to have a so-called virtual delay estimator associated therewith. In actuality, a single delay estimator (e.g., the delay estimator block 102) at the RAKE receiver 100 is typically shared by the different cells; thus the use of the term virtual. Each virtual delay estimator reports up to L paths.

The RAKE receiver 100 performs delay estimation over all cells every $T_{DE}$ slots and receives up to N·L delay estimates $d_i^{(k)}$, where k is a slot number at which the update is performed (i.e., $k=jT_{DE}$). The term "slots" is employed as a measure of time in, for example, Wideband Code Division Multiple Access (WCDMA); however, other time units may be employed without departing from principles of the invention.

The RAKE receiver 100 also receives associated power estimates $P^{(k)}$. In typical practice, the delay information contains the delay value and a scrambling code for a particular cell, and the power estimates convey an average signal power for the path over some observation interval. An observation period is typically longer than a channel fading cycle.

The M strongest paths are chosen out of a pool of up to N·L paths. In prior approaches, M typically equals C, where C is the number of available despreaders and channel estimators. Respective delays $d_m^{(k)}$ of the M strongest paths are passed to an active finger selection (AFS) stage of the channel estimator 104 (not explicitly shown), where channel estimates $h_m^{(k)}$ for all M paths are computed every slot. In various embodiments of the invention, the despreaders and channel estimators are common-pilot-channel (CPICH) despreaders and channel estimators; however, pilot symbols on the dedicated channels could also be used for these estimation tasks. The A strongest paths of the M paths (e.g., A paths satisfying some thresholding condition) are chosen for data combining. The AFS is typically updated every slot.

An illustrative set of values could be as follows: N=5, L=6, $T_{DE}$=100 slots, M=6, and A=6. A typical process akin to that discussed above works sufficiently well if the total number of paths $N \cdot N_p$, where $N_p$ is the number of significant paths per cell (i.e., the number of paths that contain, for example, at least 80% of the total received power from the cell), is not very large compared to M (i.e., the number of paths on which channel estimation may be performed). However, once the number of significant paths or the number of cells in SHO starts to increase, receiver performance starts to suffer, since when $M<<N \cdot N_p$, some paths outside the monitored set inevitably experience power peaks and produce strong interference, which degrades the actual observed SNR compared to the SNR that would be available if the choice of M paths were instantaneously optimal. Further, if M is small (e.g., M<8), there is a significant probability that all M paths are simultaneously faded, while some non-monitored paths are not, which could result in a catastrophic drop of SIR and a dropped call.

One possible approach is to increase M, thereby monitoring more paths, leaving fewer paths unmonitored, and reducing the probability of simultaneous deep fade of all monitored paths. However, since in prior approaches C=M, increasing M has a direct consequence of requiring more despreaders that, in most typical cases, would not be fully utilized. It is undesirable to have under-utilized despreaders, since hardware costs would be greater than required to handle typical conditions.

Figure 2:
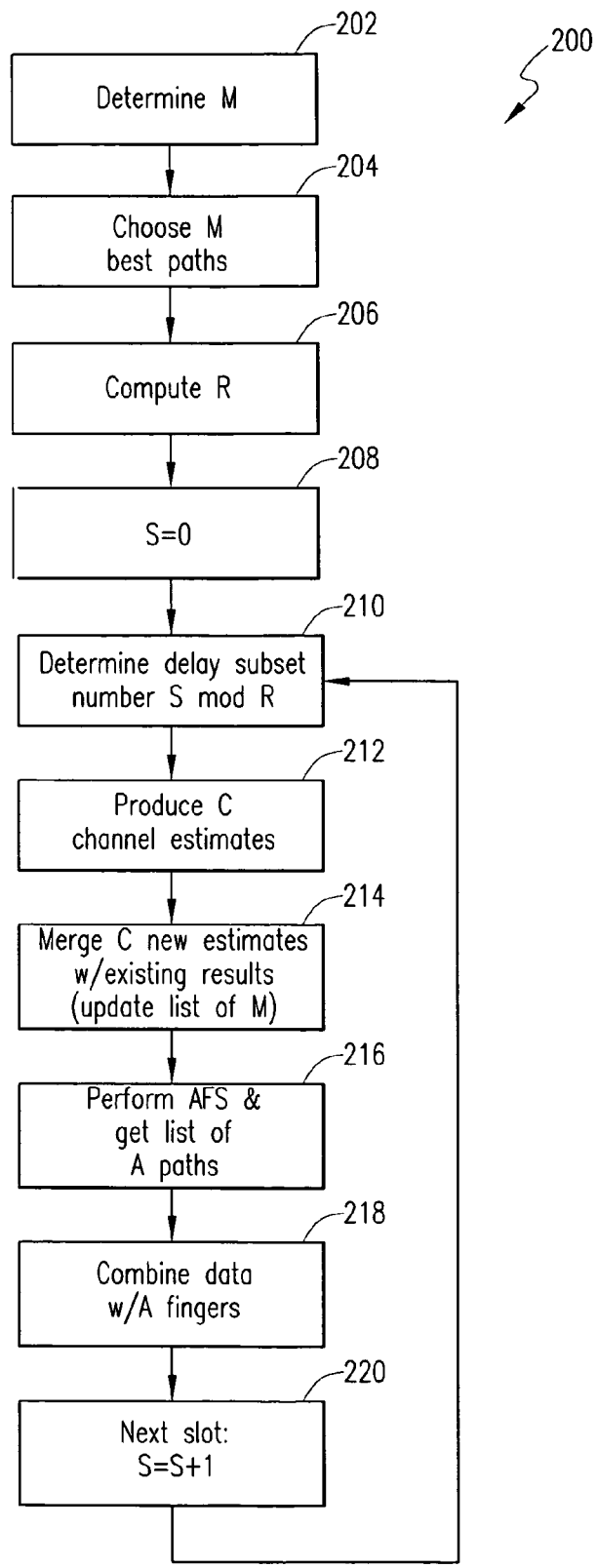
FIG. 2 is a flow diagram illustrating a path-selection process in accordance with principles of the present invention.

FIG. 2 is a flow diagram illustrating a path-selection process 200 in accordance with principles of the invention. The path-selection process 200 serves to reduce the likelihood of encountering strong non-monitored paths in a rich multipath environment without requiring unnecessary hardware expansion. In various embodiments of the invention, the virtual delay estimators provide a list of paths $d_i^k$, along with an average power for each path $P_i^k$. The path-selection process 200 then proceeds as described below at at least one path-selection update instance.

The path-selection process 200 begins at step 202. At step 202, the number of paths to be monitored M is determined from a list of as many as N·L total available paths, considering, for example, a number of reported paths and a channel variation speed. At step 204, the M best paths are chosen from the list of as many as N·L paths. At step 206, a channel-estimator-reuse factor R is computed, where R=M/C. R may be used specifically as the exact length of a complete channel estimation update cycle when R is an integer; when R is not an integer, R represents an approximation to characterize an average channel-estimation delay.

From step 206, execution proceeds to step 208. At step 208, a slot-number counter S is set to 0. From step 208, execution proceeds to step 210. At step 210, a delay subset number S mod R is determined, which is a remainder operation used to determine which of R possible path subsets should be monitored in the current slot.

Steps 212-218 are performed so that all M paths are monitored every R slots. At step 212, C new channel estimates are produced by C available channel estimators and RAKE despreaders/combiners. At step 214, the C new channel estimates produced at step 212 are merged with any existing channel-estimate results to update a list of M best paths. At step 216, automatic finger selection is performed and a list of A paths is obtained, where A is the number of paths used for data combining. At step 218, data from the A paths obtained at step 216 are combined using A RAKE fingers. At step 220, the slot-number counter S is incremented. From step 220, execution returns to step 210.

In contrast to the path-selection process 200, channel estimation and active finger selection updating may be continuously performed as new channel estimations become available via a resource-sharing scheme, such as, for example, round-robin activation, rather than once per every R slots. When channel estimation and active finger selection updating are continuously performed, R does not need to be an integer. However, it is still useful to use R=M/C as an average-channel-estimation-delay measure.

In various embodiments of the invention, steps 202-208 may be performed less frequently than steps 210-218. In many circumstances, it would suffice to perform steps 202-208 at a rate comparable to the channel coherence time.

An appropriate R value may be defined according to many different criteria. One possible criterion would be to limit the average remaining uncaptured signal energy. For example, let there be a total of I paths available, and let a path list be sorted in descending order according to the average power $P_i^k$. M should be chosen so that $$\sum_{i=1}^{M} P_i^{(k)} = (1-\gamma) \sum_{i=1}^{I} P_i^{(k)}$$

where $\gamma$ is the fraction of remaining uncaptured signal (e.g. $\gamma=0.2$).

In another option, in order to reduce the required value of R, which may be desirable at high speeds, channel estimates for momentarily-strongest paths that contribute most to the combined SIR could be updated more frequently. For example, Z strongest paths could be updated every slot using dedicated despreaders. The remaining M-Z paths could use the remaining C-Z despreaders in accordance with a resource-sharing scheme (e.g., round-robin, weighted round-robin, deficit round-robin, weighted fair queueing, stochastic fairness queueing). The channel-estimator-reuse factor will then be R=(M-Z)/(C-Z).

Z could be chosen based on a fading rate. For slower fading, Z could be larger. Z could be set to a value just large enough to allow circulating through the M-Z paths in less than the channel coherence time, which would, in most cases, render the channel estimation quality virtually unaffected, while maintaining a large subset of all available paths in contention for combining.

In another option, the paths could be divided into two classes. For frequent (e.g., a few strong paths) and infrequent (e.g., the remaining, weaker, paths) updates, assign $C_{frequent}$ and $C_{infrequent}$ channel-estimator hardware units to the classes respectively and run an independent resource-sharing schedule (e.g., round-robin) in each.

Figure 3:
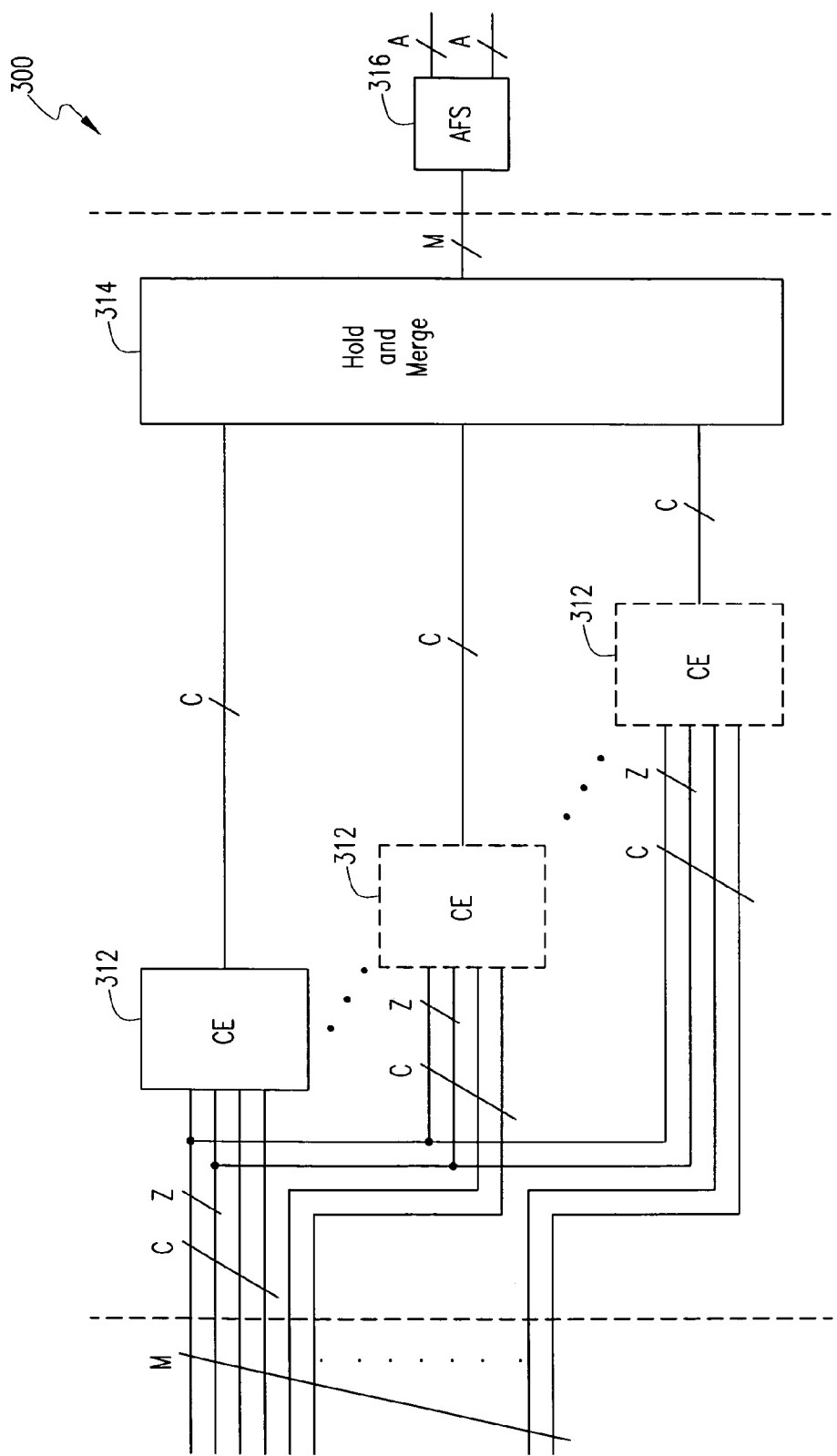
FIG. 3 is a functional block diagram illustrating the process of FIG. 2.

FIG. 3 is a functional block diagram at 300 illustrating the process of FIG. 2. The diagram 300 illustrates production of C channel estimates from M paths to be monitored by a channel estimator block 312, which block corresponds to step 212 of FIG. 2 and may be performed by, for example, the channel estimator block 104 of FIG. 1. As noted above, the same channel estimator hardware may be used repeatedly with different inputs at different slots as illustrated by the multiple occurrences of the same channel estimator block 312 in FIG. 3, subsequent instances of the channel estimator block 312 being illustrated with dashed lines. Also illustrated in FIG. 3 are Z dedicated despreaders, where Z may be chosen to be, for example, between 1 and C−1, inclusive. When Z is zero, the solution of FIG. 2 results. When Z=C, a prior solution results.

Block 314, which corresponds to step 214 of FIG. 2, performs a hold and merge function in order to update the list of M best paths. The output of hold and merge block 314 is input to an AFS block 316, which corresponds to step 216 of FIG. 2. The AFS block 316 performs active finger selection in order to obtain a list of A paths, where A is the number of paths selected by the AFS block 316 for data combining.

Various embodiments of the invention provide a flexible solution that may be used to allow a trade-off between the number of paths considered for combining and the channel-estimation update rate without a need for hardware expansion. In rich multipath conditions, the degradation due to slightly delaying the channel estimate is typically negligible compared to the benefit of avoiding a deep fade and a severe SIR dip. Moreover, no significant computational overhead is imposed, although some extra bookkeeping in shuffling the channel estimates may be needed.

While an illustrative SHO scenario has been discussed herein, various embodiments of the invention may be applied to any situation where a total number of paths exceeds a number of available channel-estimator hardware units, including, for example, a single-cell reception scenario with a rich multipath channel, in which case N=1. Those having ordinary skill in the art will appreciate that many other methods of determining R, and round-robin and other resource-sharing schemes besides those described herein, may be employed without departing from principles of the invention.

Various embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform steps according to principles of the present invention may also reside, in whole or in part, in static or dynamic main memories or in firmware within a processor (e.g., within microcontroller, microprocessor, or a microcomputer internal memory).

It should be emphasized that the terms "comprise/comprises/comprising" when used in this specification are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A signal-path-selection method in a RAKE receiver, the method comprising:
   producing C channel estimates from M received signal paths;
   determining a plurality of best signal paths using the C produced channel estimates further comprising updating a previously-determined list of the plurality of best signal paths by merging the C produced channel estimates into the previously-determined list of the plurality of best signal paths;
   choosing A signal paths of the plurality of best signal paths in accordance with at least one pre-determined criterion;
   combining the A signal paths;
   wherein C is a measure of channel-estimation capacity of the RAKE receiver; and
   wherein M is greater than C.

2. A signal-path-selection method in a RAKE receiver, the method comprising:
   producing C channel estimates from M received signal paths;
   determining a plurality of best signal paths using the C produced channel estimates;
   choosing A signal paths of the plurality of best signal paths in accordance with at least one pre-determined criterion;
   combining the A signal paths;
   wherein C is a measure of channel-estimation capacity of the RAKE receiver;
   wherein M is greater than C;
   wherein the producing, determining, choosing, and combining steps are performed once per every R time units; and
   wherein R=M/C.

3. The signal-path-selection method of claim 2, wherein R is selected so as to limit an average uncaptured signal energy following the combining step.

4. The signal-path-selection method of 1, further comprising:
   performing the producing, determining, choosing, and combining steps once per every R time units; and wherein R is selected so that channel estimates for momentarily-strongest paths that contribute most to a signal-to-interference ratio are updated more frequently than other channel estimates.

5. The signal-path-selection method of claim 4, wherein:
coefficients of Z signal paths are estimated every time unit using Z dedicated despreaders;
Z is not greater than C−1; and
Z is not less than 1.

6. The signal-path-selection method of claim 5, wherein Z is determined based on a fading rate.

7. The signal-path-selection method of claim 6, wherein Z is directly proportionate to the fading rate.

8. The signal-path-selection method of claim 5, wherein M-Z signal paths are estimated using C-Z non-dedicated despreaders according to a resource-sharing scheme.

9. A signal-path-selection method in a RAKE receiver, the method comprising:
assigning a group of $C_{frequent}$ channel-estimation hardware units to at least one relatively-strong signal path;
assigning a group of $C_{infrequent}$ channel-estimation hardware units to at least one relatively-weak signal path, wherein $C_{frequent}$ plus $C_{infrequent}$ equals C,
producing C channel estimates from M received signal paths, wherein C is a measure of channel-estimation capacity of the RAKE receiver and M is greater than C;
determining a plurality of best signal paths using the C produced channel estimates;
choosing A signal paths of the plurality of best signal paths in accordance with at least one pre-determined criterion; and
combining the A signal paths;
wherein the producing, determining, choosing, and combining steps are performed according to an independent resource-sharing scheme for each of the groups of $C_{frequent}$ and $C_{infrequent}$ channel-estimation hardware units.

10. A RAKE receiver comprising:
a channel estimator for producing C channel estimates from M received signal paths, wherein C is a measure of channel-estimation capacity of the RAKE receiver; and M is greater than C;
a RAKE combiner for choosing A signal paths of a plurality of determined best signal paths and combining the A chosen signal paths; and
logic for updating a previously-determined list of the plurality of best signal paths by merging the C produced channel estimates into the previously-determined list of the plurality of best signal paths.

11. A RAKE receiver comprising:
a channel estimator for producing C channel estimates from M received signal paths, wherein C is a measure of channel-estimation capacity of the RAKE receiver; and M is greater than C; and
a RAKE combiner for choosing A signal paths of a plurality of determined best signal paths and combining the A chosen signal paths; wherein the RAKE receiver is adapted to produce the C channel estimates and choose and combine the A signal once per every R time units; and
R=M/C.

12. The RAKE receiver of claim 11, wherein R is selected so as to limit an average uncaptured signal energy following combination of the A signal paths.

13. The RAKE receiver of claim 10, wherein:
the production of the C channel estimates the choosing of the A signal paths, and the combining of the A chosen signal paths occur once per every R time units; and
R is selected so that channel estimates for momentarily-strongest paths that contribute most to a signal-to-interference ratio are updated more frequently than other channel estimates.

14. The RAKE receiver of claim 13, wherein:
coefficients of Z signal paths are estimated every time unit using Z dedicated despreaders;
Z is not greater than C-1; and
Z is not less than 1.

15. The RAKE receiver of claim 14, wherein Z is determined based on a fading rate.

16. The RAKE receiver of claim 15, wherein Z is directly proportionate to the fading rate.

17. The RAKE receiver of claim 14, wherein M-Z signal paths are estimated using the C-Z non-dedicated despreaders according to a resource-sharing scheme.

18. A RAKE receiver comprising:
a channel estimator for producing C channel estimates from M received signal paths, wherein C is a measure of channel-estimation capacity of the RAKE receiver; and M is greater than C;
a RAKE combiner for choosing A signal paths of a plurality of determined best signal paths and combining the A chosen signal paths; and
logic for assigning a group of $C_{frequent}$ channel-estimation hardware units to at least one relatively-strong signal path;
logic for assigning a group of $C_{infrequent}$ channel-estimation hardware units to at least one relatively-weak signal path;
wherein the channel estimator comprises C channel-estimation hardware units;
wherein the RAKE receiver is adapted to produce channel estimates and choose and combine signal paths according to an independent resource-sharing scheme for each of the groups of $C_{frequent}$ and $C_{infrequent}$ channel-estimation hardware units; and
wherein $C_{frequent}$ plus $C_{infrequent}$ equals C.

19. An article of manufacture for performing signal-path-selection in a RAKE receiver, the article of manufacture comprising:
at least one computer readable medium;
processor instructions contained on the at least one computer readable medium, the processor instructions configured to be readable from the at least one computer readable medium by at least one processor and thereby cause the at least one processor to operate as to:
produce C channel estimates from M received signal paths;
determine a plurality of best signal paths using the C produced channel estimates by updating a previously-determined list of the plurality of best signal paths;
choose A signal paths of the plurality of best signal paths in accordance with at least one pre-determined criterion; and
combine the A signal paths; and
wherein C is a measure of channel-estimation capacity of the RAKE receiver; and
wherein M is greater than C;
wherein the updating a previously-determined list of the plurality of best signal paths is performed by merging the C produced channel estimates into the previously-determined list of the plurality of best signal paths.

20. The article of manufacture of claim 19, further comprising:

processor instructions configured to cause the at least one processor to operate as to perform the producing, determining, choosing, and combining once per every R time units; and wherein R is selected so that channel estimates for momentarily-strongest paths that contribute most to a signal-to-interference ratio are updated more frequently than other channel estimates.

\* \* \* \* \*

UNITED STATES PATENT AND TRADEMARK OFFICE
CERTIFICATE OF CORRECTION

PATENT NO. : 7,480,356 B2 Page 1 of 1
APPLICATION NO. : 11/007685
DATED : January 20, 2009
INVENTOR(S) : Reial It is certified that error appears in the above-identified patent and that said Letters Patent is hereby corrected as shown below:

In Column 6, Line 64, in Claim 4, delete "1," and insert -- claim 1, --, therefor.

Signed and Sealed this

Second Day of June, 2009

JOHN DOLL
*Acting Director of the United States Patent and Trademark Office*